United States Patent
Jo et al.

(10) Patent No.: US 11,357,599 B1
(45) Date of Patent: Jun. 14, 2022

(54) METHOD FOR PRODUCING AN ALIGNER

(71) Applicant: CA-DIGITAL GMBH, Hilden (DE)

(72) Inventors: Yong-Min Jo, Duesseldorf (DE); Daniela Dudai, Noertershausen (DE)

(73) Assignee: CA-DIGITAL GmbH, Hilden (DE)

( * ) Notice: Subject to any disclaimer, the term of this patent is extended or adjusted under 35 U.S.C. 154(b) by 0 days.

(21) Appl. No.: 17/548,670

(22) Filed: Dec. 13, 2021

Related U.S. Application Data

(63) Continuation of application No. PCT/EP2020/065815, filed on Jun. 8, 2020.

(30) Foreign Application Priority Data

Jun. 14, 2019 (DE) .......................... 102019116185.1

(51) Int. Cl.
*G06T 15/00* (2011.01)
*A61C 7/00* (2006.01)
(Continued)

(52) U.S. Cl.
CPC ................ *A61C 7/002* (2013.01); *A61C 7/08* (2013.01); *A61C 9/0053* (2013.01); *B33Y 10/00* (2014.12);
(Continued)

(58) Field of Classification Search
CPC ....... A61C 9/0046; A61C 7/10; A61C 1/0015; A61C 19/04; A61C 7/002; A61C 7/08;
(Continued)

(56) References Cited

U.S. PATENT DOCUMENTS

| 2007/0087302 A1 | 4/2007 | Reising |
| 2008/0064008 A1* | 3/2008 | Schmitt ................. A61C 7/002 382/128 |

(Continued)

FOREIGN PATENT DOCUMENTS

| EP | 2957252 | 12/2015 |
| WO | WO2012140021 | 10/2012 |
| WO | WO2017176908 | 10/2017 |

*Primary Examiner* — Quan M Hua
(74) *Attorney, Agent, or Firm* — Von Rohrscheidt Patents

(57) ABSTRACT

A method for producing an aligner for teeth of a patient, the method including initially capturing a virtual current model of the teeth with a current position of the teeth: segmenting the teeth in the virtual current model and interpolating interdental surfaces of the teeth; generating a virtual nominal model of the teeth including undercut portions from the virtual current model; automatically determining the undercut portions in the virtual nominal model; automatically removing all surface elements that are associated with the undercuts from the virtual nominal model; subsequently closing gaps in the virtual nominal model created by removing the surface elements wherein closing the gaps is performed by interpolation for blocking out; automatically blocking out the undercut portions in the virtual nominal model to produce a blocked out virtual nominal model; producing a real model of the teeth based on the blocked out virtual nominal model; applying a synthetic material foil to the real model by a deep drawing method; and hardening the synthetic material foil on the real model to form the aligner and removing the aligner from the real model.

8 Claims, 2 Drawing Sheets

(51) Int. Cl.
 *A61C 7/08* (2006.01)
 *A61C 9/00* (2006.01)
 *G06T 7/10* (2017.01)
 *B33Y 70/00* (2020.01)
 *B33Y 10/00* (2015.01)
 *B33Y 80/00* (2015.01)

(52) U.S. Cl.
 CPC ............... *B33Y 70/00* (2014.12); *B33Y 80/00* (2014.12); *G06T 7/10* (2017.01); *G06T 2207/10028* (2013.01); *G06T 2207/30036* (2013.01)

(58) Field of Classification Search
 CPC .............. A61C 9/0053; A61C 13/0004; A61C 13/0019; A61C 13/34; G06T 2207/30036; G06T 2210/41; G06T 7/0012; G06T 7/0014; G06T 19/00; G06T 2200/24; G06T 15/08; G06T 7/75; G06T 19/006; G06T 2207/10081; G06T 2207/20081; G06T 2207/20084; G06T 7/168; G06T 17/00; G06T 19/20; G06T 2207/20224; G06T 2219/2021; G06T 7/136; G06T 7/174; G06T 2207/10016; G06T 2207/10021; G06T 7/344; G06T 7/55; G06T 7/579; G06K 9/6273; G06K 9/6201; G06K 9/627; G06V 10/454; G06V 10/82; G06V 2201/033
 See application file for complete search history.

(56) References Cited

U.S. PATENT DOCUMENTS

2014/0012897 A1    1/2014  Miao
2017/0224448 A1*  8/2017  Kopelman ............. A61C 7/002
2017/0281313 A1*  10/2017  Kim ......................... A61C 7/08

* cited by examiner

METHOD FOR PRODUCING AN ALIGNER

RELATED APPLICATIONS

This application is a continuation of International patent application PCT/EP2020/065815 filed on Jun. 8, 2020 claiming priority from German Patent Application 10 2019 116 185.1 filed Jun. 14, 2019 both of which are incorporated in their entirety by this reference.

FIELD OF THE INVENTION

The invention relates to a method for producing an aligner for teeth of a patient.

BACKGROUND OF THE INVENTION

Producing aligners or nighttime braces is known. The teeth in the jaw of patients have undercuts in particular in a transition portion between tooth and gum wherein the undercut portions are filled in the real model manually using dental wax or liquid synthetic material in order to prevent a binding of the aligner on the real model and in order to prevent a binding during insertion and removal of the aligner from a mouth of the patient. This activity of filling in the undercut portions is designated as blocking.

Generic methods are known from US 2014/0142897 A1 and WO 2012/140021 A2. Processing in the virtual model facilitates an algorithmic determination of the undercuts and automating a labor intensive process.

BRIEF SUMMARY OF THE INVENTION

Thus, it is an object of the invention to simplify blocking out.

The object is achieved by a method for producing an aligner for teeth of a patient, the method including initially capturing a virtual current model of the teeth with a current position of the teeth; segmenting the teeth in the virtual current model and interpolating interdental surfaces of the teeth; generating a virtual nominal model of the teeth including undercut portions from the virtual current model; automatically determining the undercut portions in the virtual nominal model; automatically removing all surface elements that are associated with the undercut portions and the interdental surfaces from the virtual nominal model; and subsequently closing gaps in the virtual nominal model created by removing the surface elements wherein closing the gaps is performed by interpolation for blocking out; automatically blocking out the undercut portions in the virtual nominal model to produce a blocked out virtual nominal model; producing a real model of the teeth based on the blocked out virtual nominal model; applying a synthetic material foil to the real model by a deep drawing method; and hardening the synthetic material foil on the real model to form the aligner and removing the aligner from the real model.

Advantageously the method according to the invention initially captures a virtual current model with a current position of the teeth. The teeth are segmented in the current model and interdental surfaces of the teeth are interpolated. The current model can be captured e.g. by an inter oral scanner or from the plaster model by a model scanner and can be subsequently processed on a computer. Segmenting is typically designated as a semi-automatic selection of partial surfaces of the current model and association thereof with specific teeth. Interpolation of interdental surfaces for closing the gaps created in the surfaces of the individual teeth and the extrapolation of the tooth roots are known in the art.

Removing the interdental surfaces before blocking out reduces complexity of the nominal model and simplifies the subsequent computation steps for blocking out the nominal model.

Thus, the blocking of the undercut portions can be performed in a particularly simple manner. Various algorithms are known that are suitable for interpolating gaps in a surface model.

Advantageously, a chewing surface between the teeth in the lower jaw and the upper jaw is determined in the nominal model according to the method according to the invention. Then surface elements of the nominal model that project into the chewing surface perpendicular to the chewing surface are automatically determined and associated with the undercut portions. The chewing surface as a collision portion of the teeth of the upper jaw and lower jaw and surface elements of the nominal model that project orthogonal into the chewing surface can be easily determined by algorithms. Blocking the surface elements thus determined substantially prevents binding of the aligner on the real nominal model.

Advantageously the method according to the invention fills an alveole in the nominal model between teeth that are adjacent to each other with a gap there between automatically in a direction towards the chewing surface in order to determine the chewing surface. Filling alveoles or tooth gaps by blocking with dental wax is well known. Thus, deep incisions in the aligner are prevented wherein the deep incisions otherwise tend to bind at the real model or at the jaw of the patient or otherwise establish a contact between aligner and gingival that is typically perceived uncomfortable.

Advantageously, the method according to the invention automatically removes and fills a fissure between closely adjacent teeth in the nominal model. A fissure in the context of producing aligners designates tight and tapering intermediary spaces between adjacent teeth. Fissures of this type can be determined in the nominal model based on locally high gradients between adjacent surface orthogonals.

Advantageously the method according to the invention moves the teeth in the nominal model from a misaligned current position into a nominal position. The segmented teeth are moved into their respective nominal positions in the nominal model individually or in groups. The brace produced according to the method according to the invention is useable as an aligner. In another method according to the invention the teeth are not moved in the nominal model. The brace is then useable as an overnight brace for nocturnal stabilization of the current position.

Advantageously the nominal model in a method according to the invention is a surface model which is initially automatically converted into a point cloud with surface points and surface orthogonals associated with the surface points wherein surface points of the point cloud that are associated with the undercut portions are subsequently determined for performing the block out and after the block out a surface module is computed again from the point cloud. Generating a polygonal surface model by triangulation of the current model is known in the art as well as computing a point cloud with surface points and their orthogonals from triangular surfaces in space. In the point cloud individual points can be displaced or deleted without influencing adjacent surface elements. On the other hand side, computing a surface module from a point cloud is well known, e.g: the method under the key word "MPU-Implicits" from Ohtake Y at al.: Multi-level Partition of Unity Implicits.

Advantageously the method according to the invention automatically determines a collision of spheres about adjacent surface points and the adjacent surface points are combined at a mean position. Collision determination of adjacent spheres (sphere collision) whose centers are arranged on the points of a point cloud is generally known and facilitates determining adjacent surface elements very quickly and eliminating them.

Advantageously the method according to the invention produces the real model through a rapid prototyping method, advantageously by 3-D printing. Rapid prototyping facilities a cost efficient and quick fabrication of individual pieces directly from a surface model.

The method according to the invention simplifies and accelerates the block out so that several individually blocked out intermediary steps between the current model and the nominal model can be produced quickly and economically.

BRIEF DESCRIPTION OF THE DRAWINGS

The invention is subsequently described based on embodiments with reference to drawing figures, wherein:

DETAILED DESCRIPTION OF THE INVENTION in order to produce the aligner 1 a virtual current model of teeth 2 of a patient is initially captured by an inter oral scanner and stored as a triangulated surface grid in a file on a computer. During segmentation surface segments are selected in the current model that are associated with the individual teeth 2 and associated with stored tooth types. Interdental surfaces that are missing at each individual tooth 2 after the scan are supplemented by interpolation and the missing tooth roots are supplemented by extrapolation based on a respectively selected tooth type. In the current model the teeth 2 are moved into their nominal positions, FIG. 1A shows a tooth 2 of the nominal model 3 thus created.

Figure 1A:
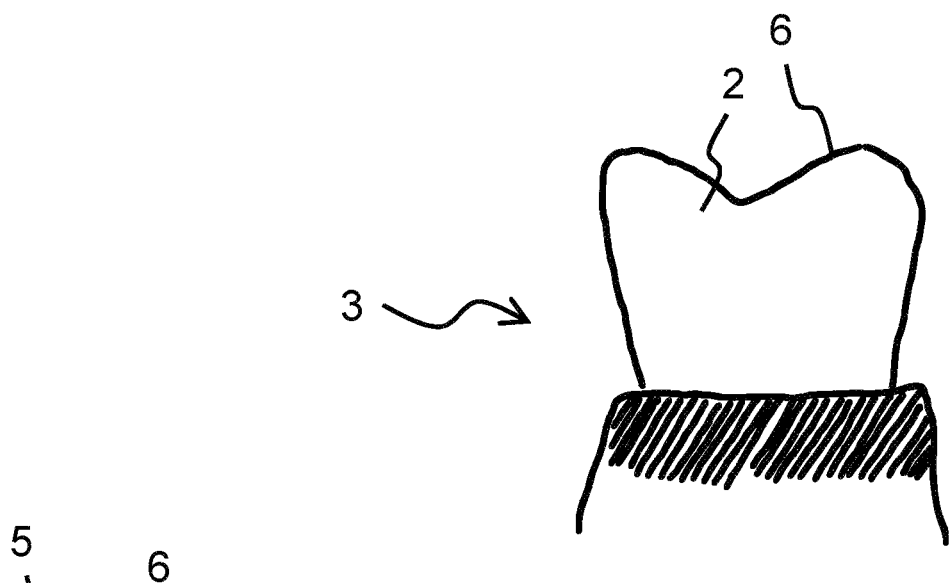
FIG. 1A illustrates a detail of a nominal model.
Figure 1B:
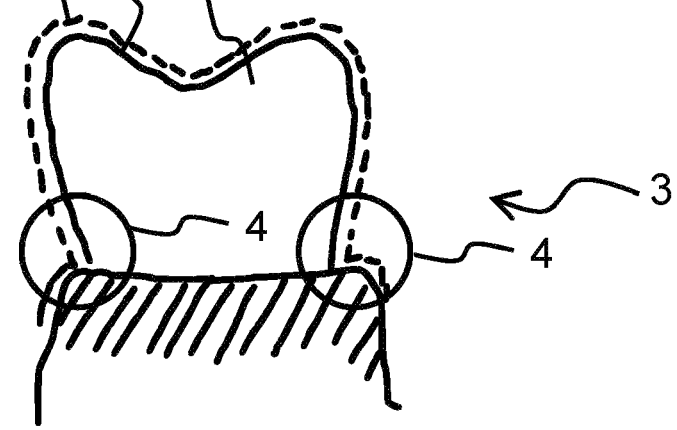
FIG. 1B illustrates a configuration of a brace without block out.
Figure 1C:
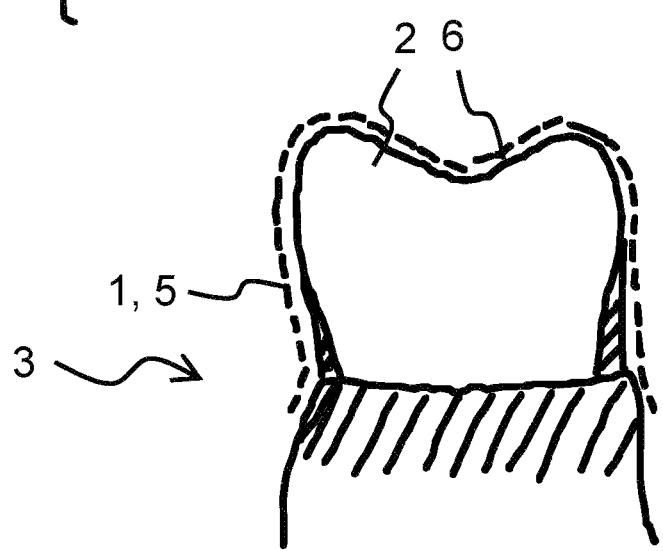
FIG. 1C illustrates a configuration of the brace with the block out.

The nominal model 3 includes undercut portions 4 that are circled in FIG. 1B. If a synthetic material foil were deep drawn in this condition onto the nominal model 3 and hardened as drawn in dashed lines the synthetic material foil would reach behind the tooth 2 and reach behind the tooth 2 at the undercut portions 4 and would be disengageable from the nominal model 3 with great difficulty or not at all. The part produced would thus not be useable as an aligner for correcting a misaligned current position of the teeth 2 of the patient.

Figure 2A:
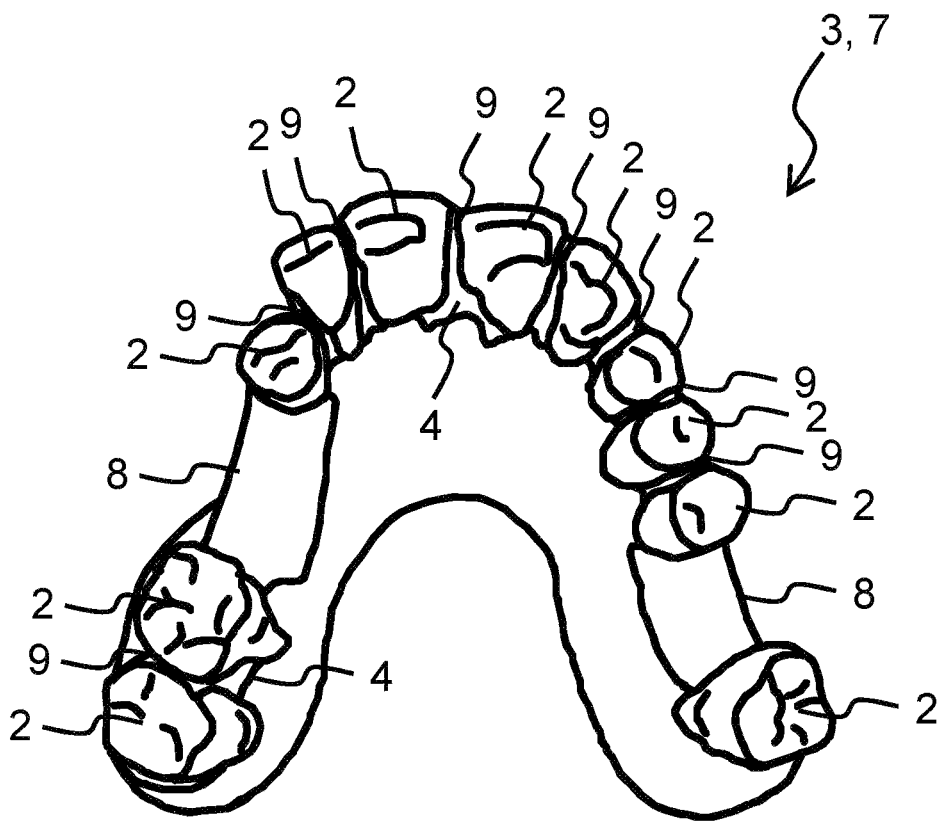
FIG. 2A-B illustrates the nominal model after the block out.

A point cloud with surface points and surface orthogonals associated with the surface points is now computed from the nominal model 3. Thereafter a chewing surface 6 is determined in which the teeth 2 of the lower jaw and of the upper jaw 7 of the patient illustrated in FIGS. 2A and 28 are in contact. Surface points that project into the chewing surface 6 perpendicular to the chewing surface 6 are associated with the undercut portions 4 and removed from the point cloud.

Portions between teeth 2 that are arranged at a greater distance from each other are recognized as alveole 8. The points of the point cloud in this alveole are also removed. Last not least fissures 9 between closely adjacent teeth 2 are determined by checking the gradients between adjacent surface orthogonals. Also here the associated points of the point cloud are removed.

Points of the point cloud associated with interdental surfaces are determined by collision determination of spheres wherein centers of the spheres are arranged at the points. Also, these points are removed from the point cloud from the point cloud.

Thus, a triangulated surface model is computed by an MPU-implicits method. This method automatically supplements the created gaps and thus blocks the undercut portion 4 and fissures 9 and fills the alveoles in a direction towards the chewing surface 6.

Figure 2B:
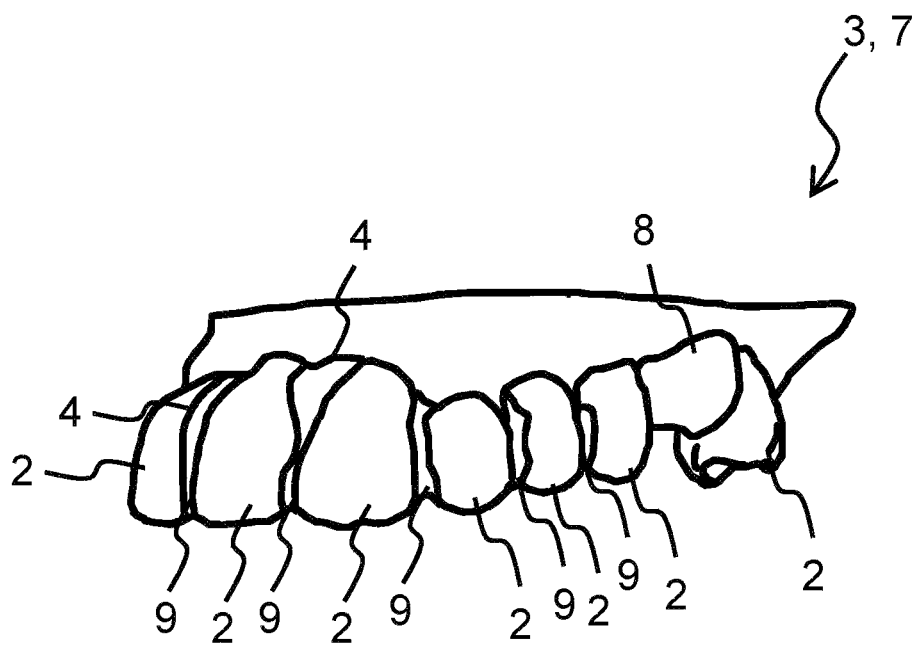

FIG. 1A and FIGS. 2A and 2B show the result in the nominal model 3 which is used for producing a real model by 3D printing. The synthetic material foil 5 is applied to the real model by deep drawing and hardened and removed from the real model as a finished aligner 1.

In order to produce another embodiment of the brace, the teeth are left in the current position and not displaced in the nominal model. This aligner is to be used as an overnight aligner.

REFERENCE NUMERALS AND DESIGNATIONS 1 aligner
2 tooth
3 nominal model
4 undercut portion
5 synthetic material foil
6 chewing surface
7 upper jaw
8 alveole
9 fissure

What is claimed is:

1. A method for producing an aligner for teeth of a patient, the method comprising:
   initially capturing a virtual current model of the teeth with a current position of the teeth;
   segmenting the teeth in the virtual current model and interpolating interdental surfaces of the teeth;
   generating a virtual nominal model of the teeth including undercut portions from the virtual current model;
   automatically determining the undercut portions in the virtual nominal model;
   automatically removing all surface elements that are associated with the undercut portions and the interdental surfaces from the virtual nominal model; and
   subsequently closing gaps in the virtual nominal model created by removing the surface elements wherein closing the gaps is performed by interpolation for blocking out;
   automatically blocking out the undercut portions in the virtual nominal model to produce a blocked out virtual nominal model;
   producing a real model of the teeth based on the blocked out virtual nominal model;
   applying a synthetic material foil to the real model by a deep drawing method; and
   hardening the synthetic material foil on the real model to form the aligner and removing the aligner from the real model.

2. The method according to claim 1, further comprising:
determining a chewing surface in the virtual nominal model between the teeth in the lower jaw and in the upper jaw; and
automatically determining surface elements of the virtual nominal model that project orthogonal to the chewing surface into the chewing surface; and
associating the surface elements with the undercuts.

3. The method according to claim 2, further comprising: automatically filling an alveole between teeth that are adjacent to one another with a gap there between in a direction towards the chewing surface in the virtual nominal model.

4. The method according to claim 1, further comprising: automatically removing and filling a fissure between closely adjacent teeth in the virtual nominal model.

5. The method according to claim 1, further comprising: moving the teeth in the virtual nominal model from the current position into a nominal position to generate the virtual nominal model.

6. The method according to claim 1, further comprising:
automatically converting the virtual nominal model configured as a surface model into a point cloud with surface points and surface orthogonals associated with the surface points; and
subsequently determining surface points of the point cloud that are associated with the undercuts for blocking out; and
after the blocking out computing a new surface model from the point cloud.

7. The method according to claim 6, further comprising: automatically computing a collision of spheres about adjacent surface points and uniting the adjacent surface points.

8. The method according to claim 1, further comprising: producing the real model by a rapid prototyping method or by 3D printing.

* * * * *